(12) United States Patent
Ngo

(10) Patent No.: US 10,787,128 B2
(45) Date of Patent: Sep. 29, 2020

(54) CARGO MANAGEMENT SYSTEM

(71) Applicant: FORD GLOBAL TECHNOLOGIES, LLC, Dearborn, MI (US)

(72) Inventor: Tom Thanh Ngo, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 16/149,276

(22) Filed: Oct. 2, 2018

(65) Prior Publication Data

US 2020/0101902 A1 Apr. 2, 2020

(51) Int. Cl.
*B60R 5/04* (2006.01)

(52) U.S. Cl.
CPC .................................. *B60R 5/044* (2013.01)

(58) Field of Classification Search
CPC ....................................................... B60R 5/044
See application file for complete search history.

(56) References Cited

U.S. PATENT DOCUMENTS

| 7,401,716 | B2 * | 7/2008 | Svenson | ................. B60R 5/045 224/42.32 |
| 9,090,210 | B2 | 7/2015 | Demma | |
| 9,132,778 | B2 | 9/2015 | Yoshizawa et al. | |
| 9,827,914 | B2 | 11/2017 | Murray et al. | |
| 2018/0154836 | A1 | 6/2018 | Herman | |

FOREIGN PATENT DOCUMENTS

| FR | 2891232 B1 | 10/2007 |
| FR | 2899169 B1 | 12/2009 |

OTHER PUBLICATIONS

English Machine Translation of FR2899169B1 dated Dec. 4, 2009.
English Machine Translation of FR2891232B1 dated Oct. 26, 2007.

* cited by examiner

*Primary Examiner* — D Glenn Dayoan
*Assistant Examiner* — Melissa Ann Bonifazi
(74) *Attorney, Agent, or Firm* — David Coppiellie; King & Schickli, PLLC

(57) ABSTRACT

A cargo management system includes a guideway and a panel displaceable between a plurality of operating positions along that guideway. The guideway includes opposed guide tracks. Each of the opposed guide tracks includes an inclined trunk and a plurality of branches extending from that inclined trunk. The panel includes opposed pivot pins received in the opposed guide tracks.

20 Claims, 17 Drawing Sheets

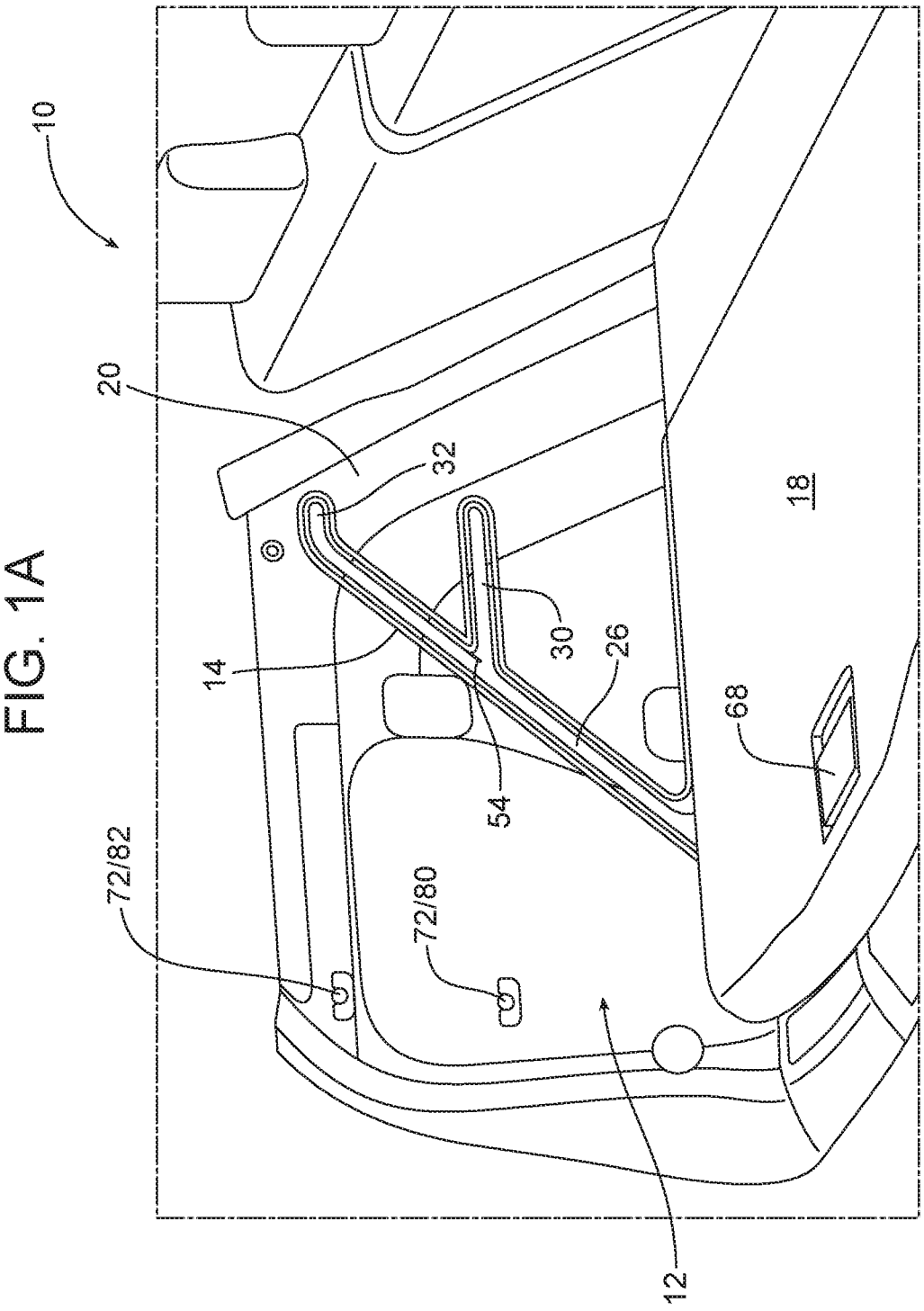

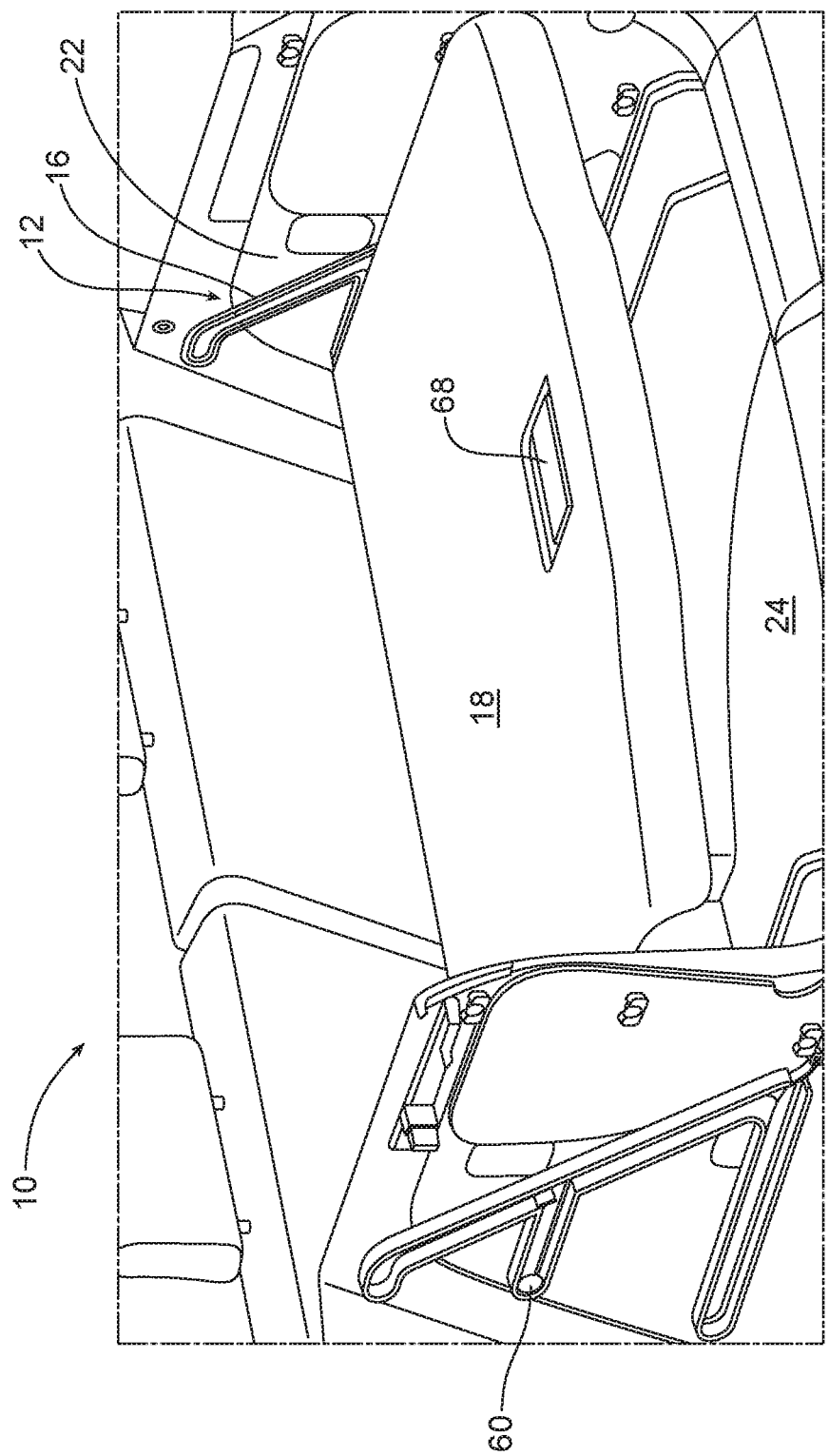

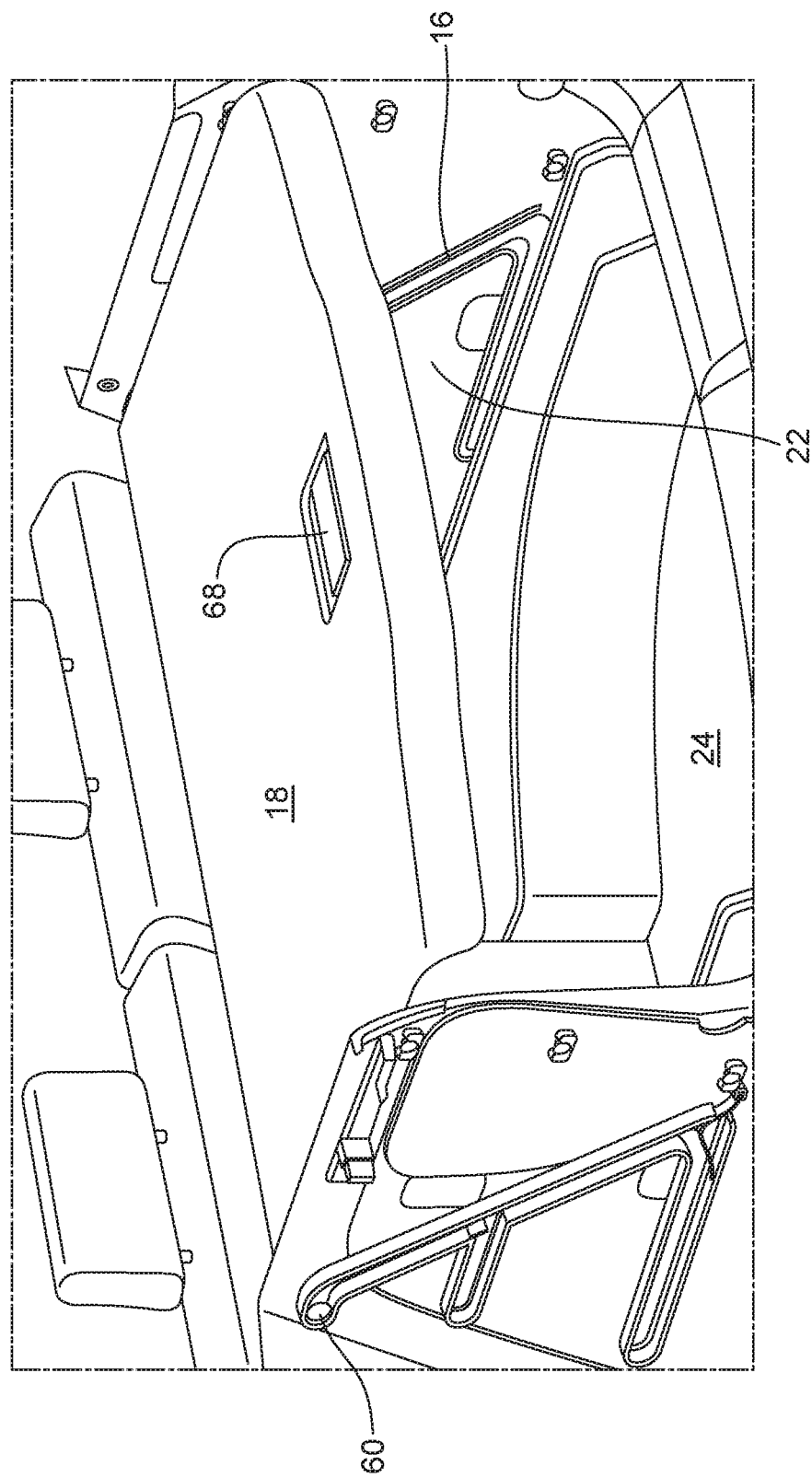

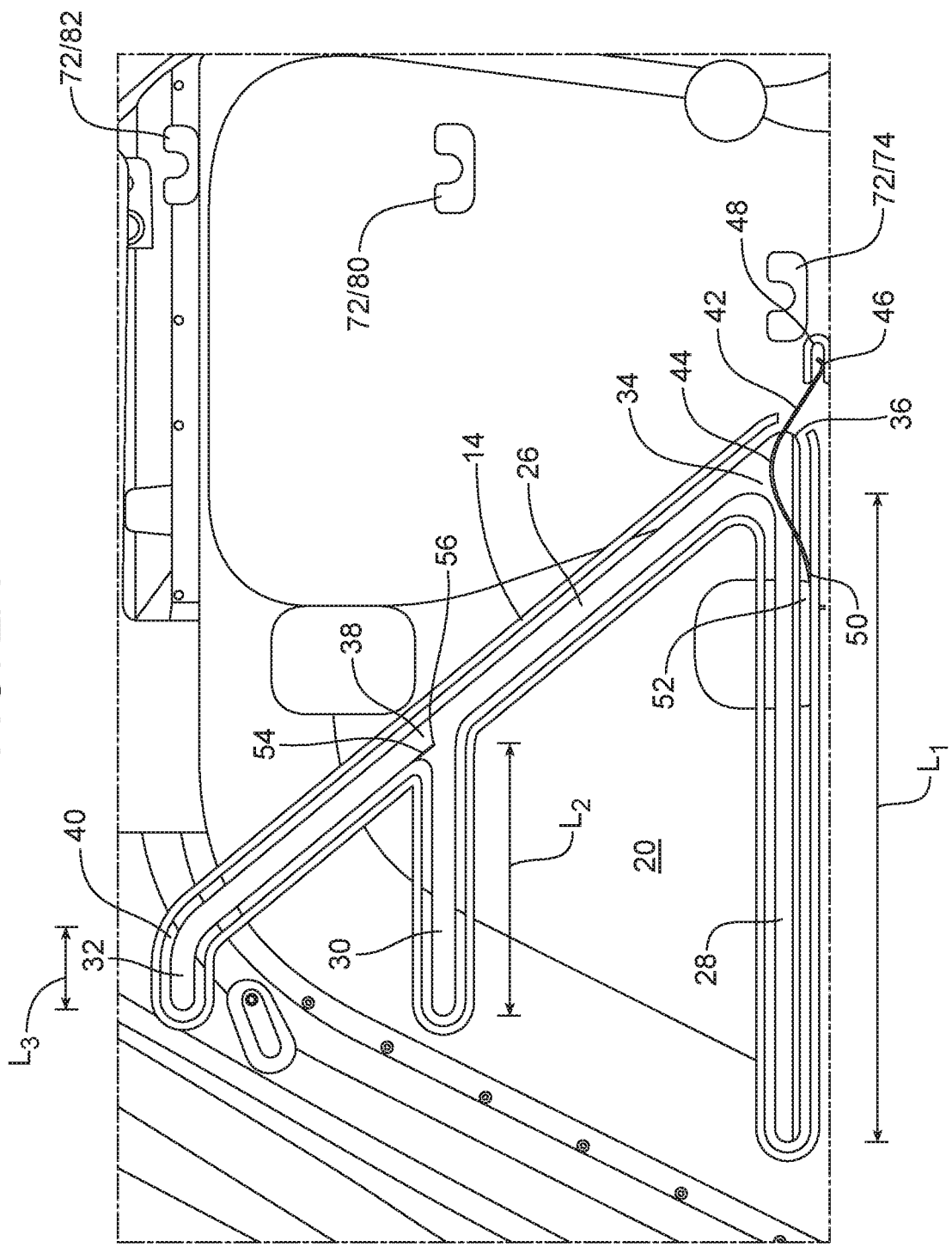

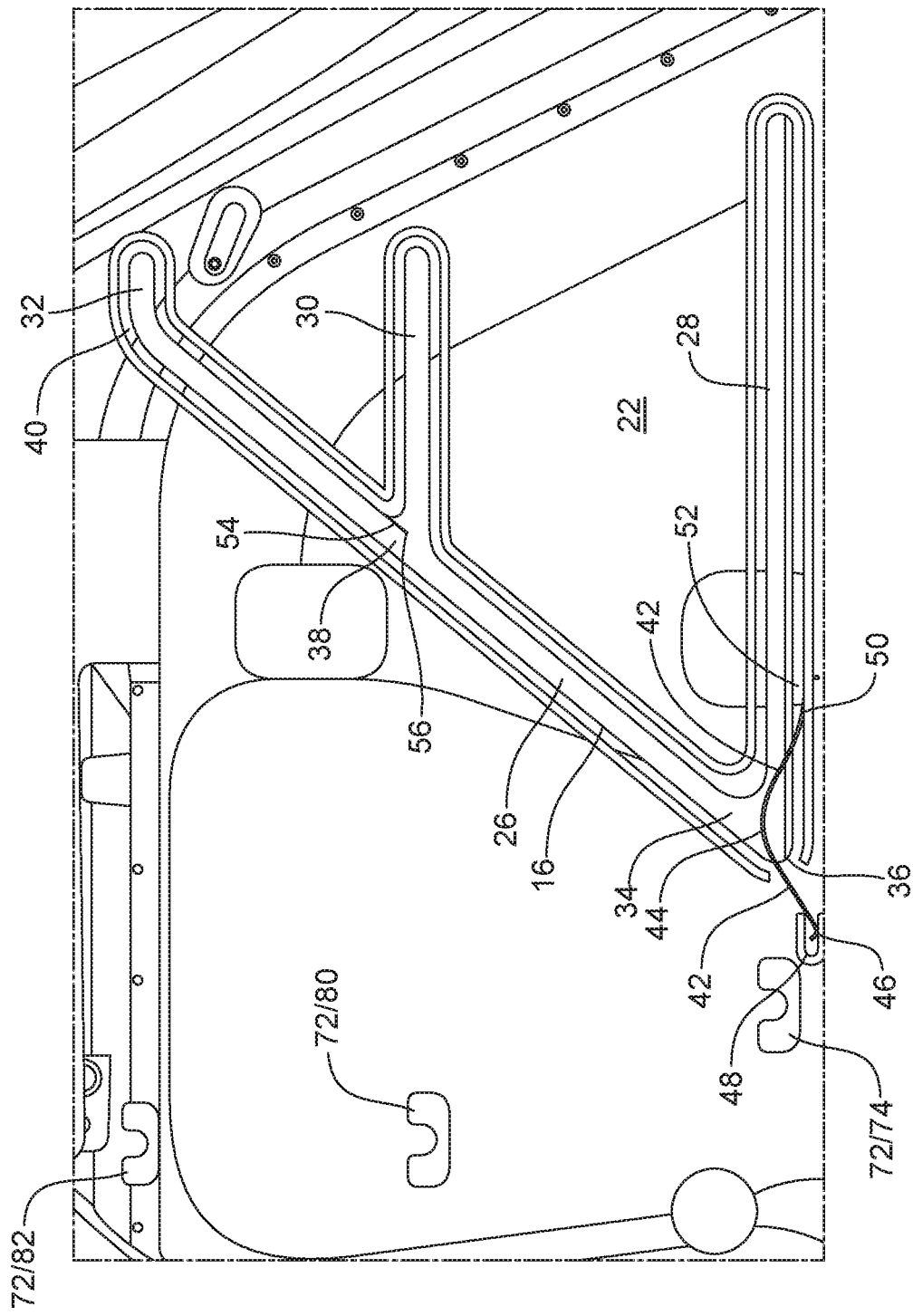

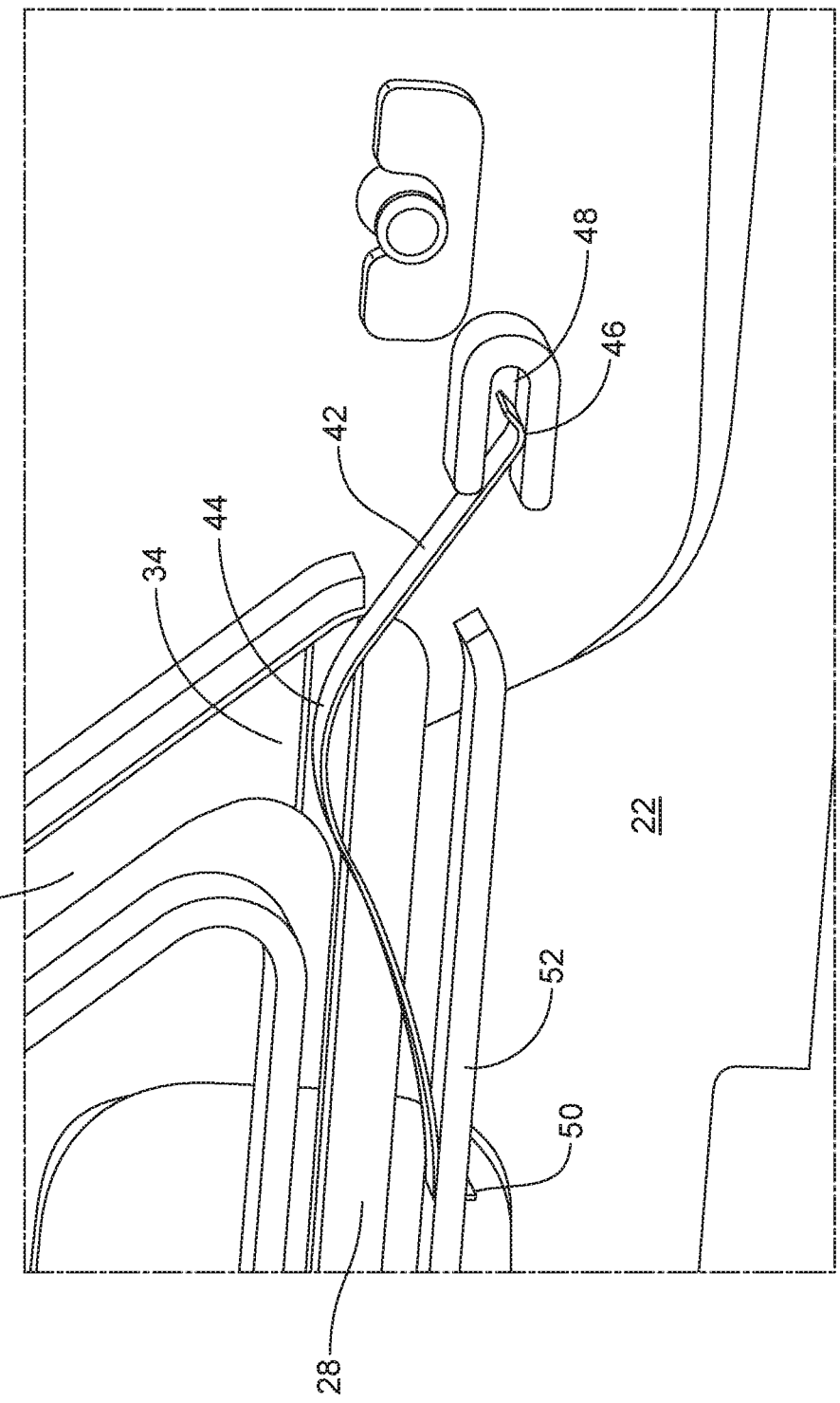

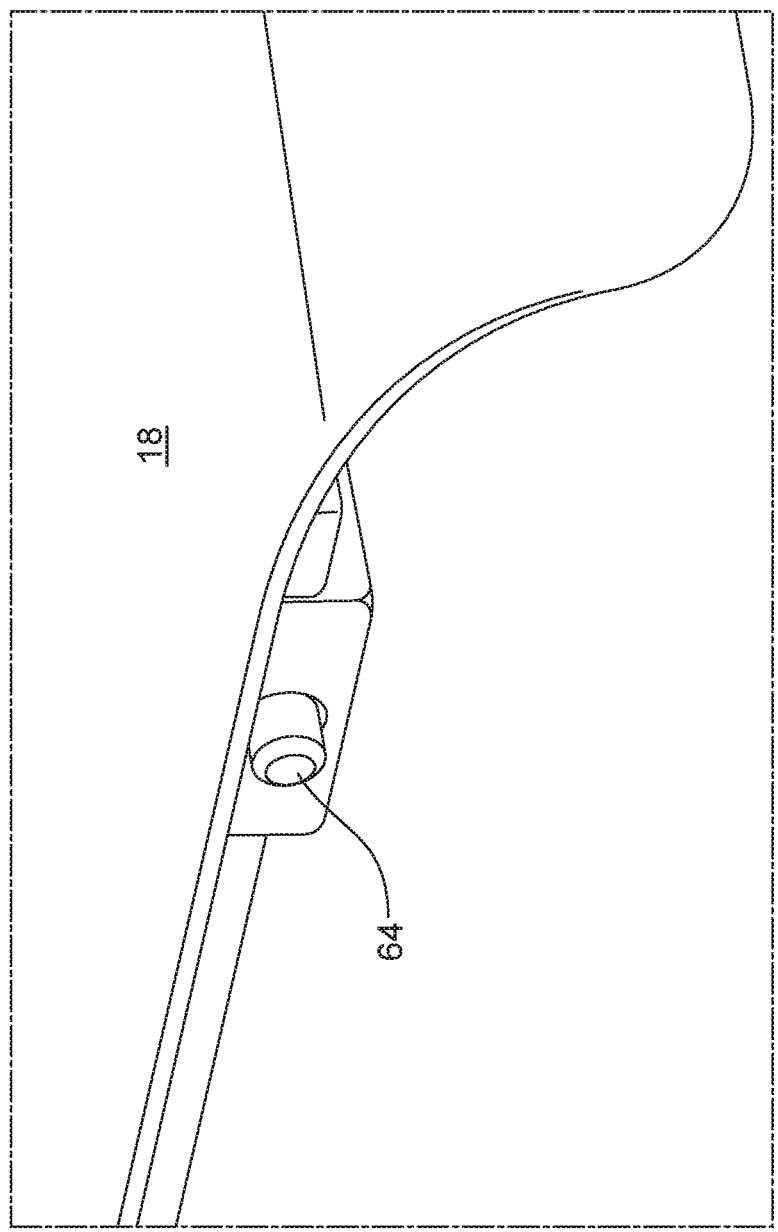

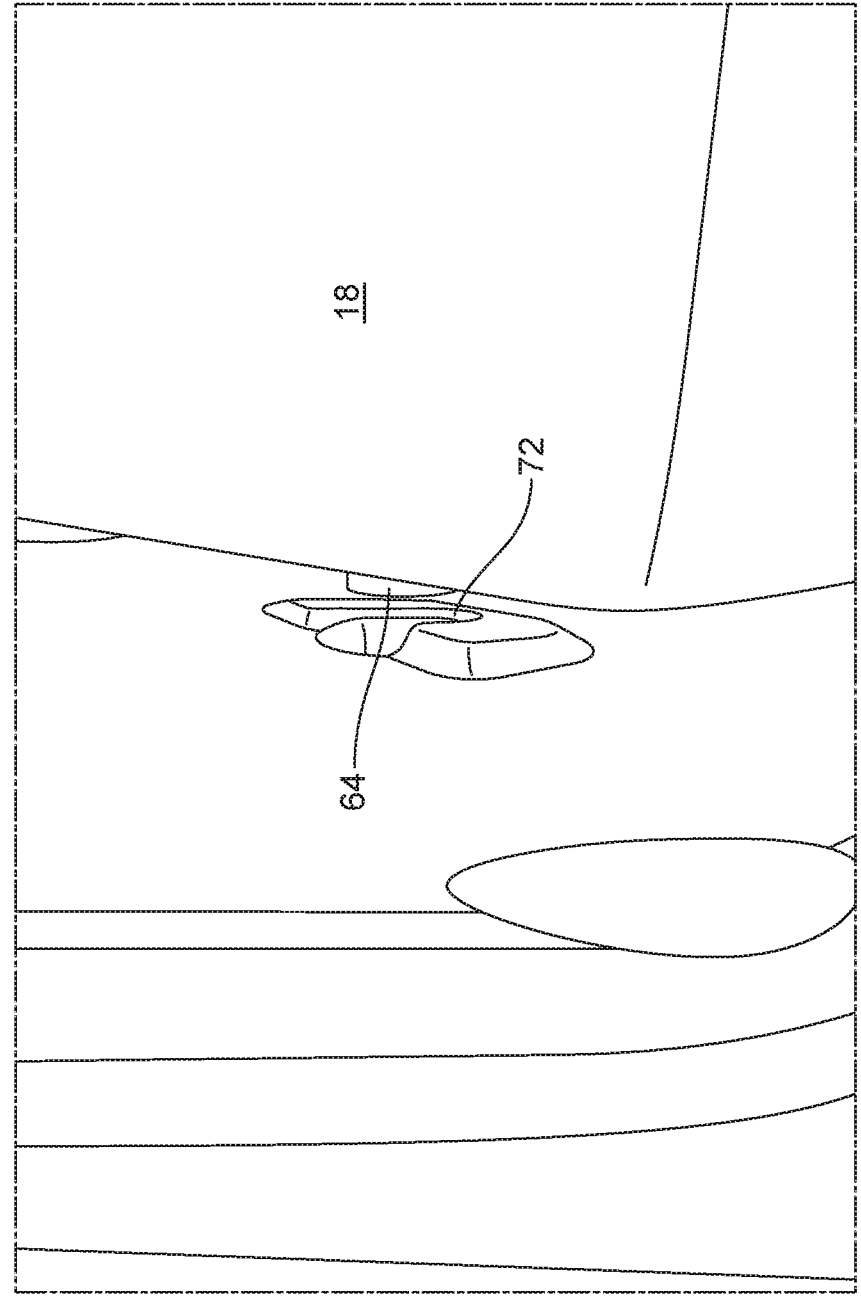

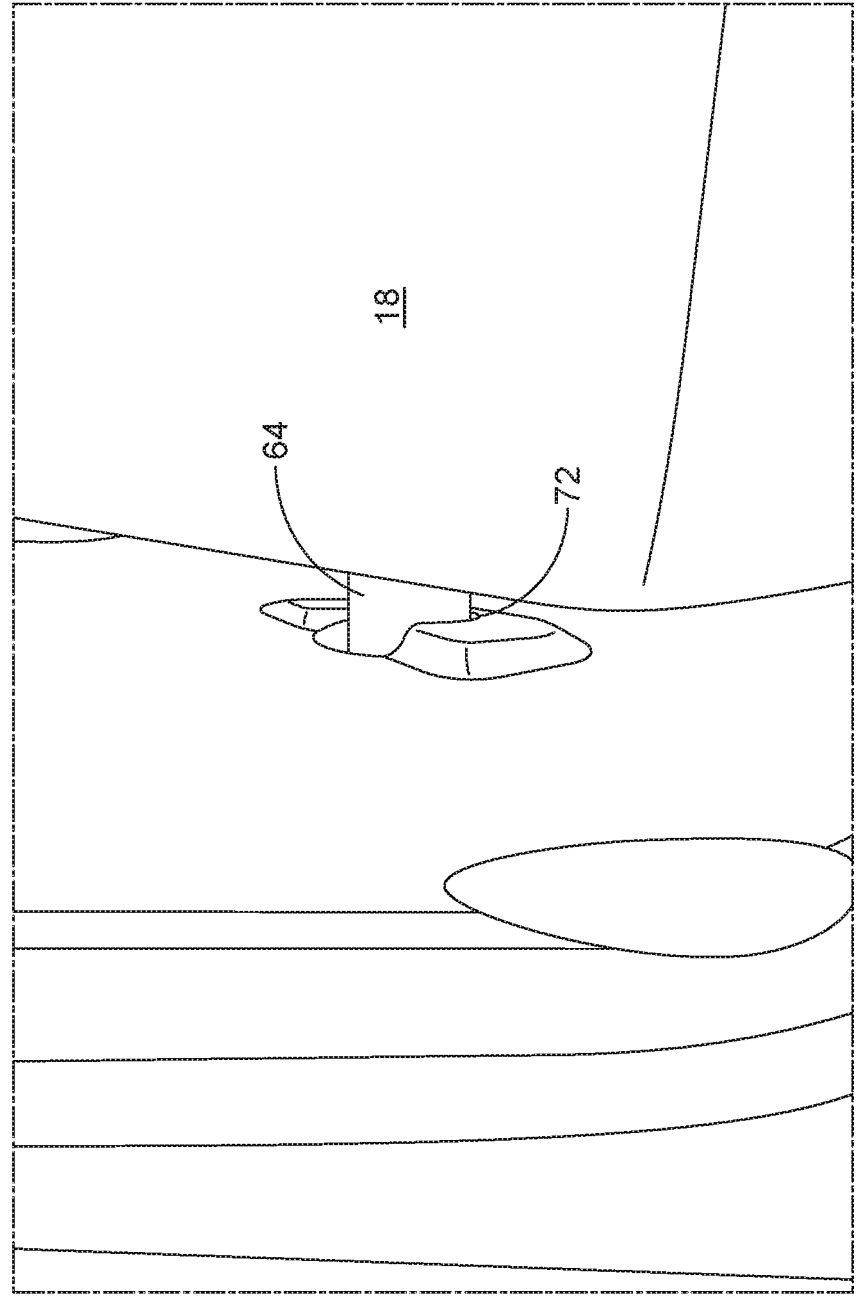

CARGO MANAGEMENT SYSTEM

TECHNICAL FIELD

This document relates generally to the motor vehicle equipment field and, more particularly, to a new and improved cargo management system adapted for use in a motor vehicle including, for example, a sport utility vehicle or crossover vehicle equipped with a rear cargo area such as may be accessed through a lift gate.

BACKGROUND

This document relates to a new and improved cargo management system including a panel that is displaceable along a guideway between a plurality of different operating positions. Advantageously, the panel may serve multiple functions depending on the operating position in which the panel is deployed. More particularly, the panel may serve as a load floor of the cargo area, as a shelf within the cargo area or as a cargo area cover that conceals cargo held in the cargo area. Advantageously, the cargo management system is inexpensive to produce, easy to operate and very versatile, allowing the displaceable panel to perform many functions that enhance the value of and customer satisfaction with the motor vehicle.

SUMMARY

In accordance with the purposes and benefits as described herein, a new and improved cargo management system is provided for use in a motor vehicle. That cargo management system comprises a guideway, including opposed guide tracks. Each of the opposed guide tracks includes an inclined trunk and a plurality of branches extending from the inclined trunk. The cargo management system also includes a panel. That panel is displaceable between a plurality of operating positions by displacing the panel along the guideway. The panel includes opposed pivot pins received in the opposed guide tracks.

The plurality of branches may include a first branch, a second branch and a third branch extending from the inclined trunk. The first branch may have a first length $L_1$, the second branch may have a second length $L_2$ and the third branch may have a third length $L_3$ where $L_1 > L_2 > L_3$.

The first branch may join the inclined trunk at a first intersection provided at a first end of the inclined trunk. The second branch may join the inclined trunk at a second intersection at an intermediate point of the inclined trunk. The third branch may join the inclined trunk at a second end of the inclined trunk.

The cargo management system may further include a first spring guide at the first intersection. Further, the cargo management system may include a second spring guide at the second intersection.

The first spring guide may comprise a strip spring having an intermediate section extending at least partially across the inclined trunk and the first branch of the guideway. The second spring guide may comprise a cantilevered strip spring having a free end extending at least partially across the second branch at the second intersection. That cantilevered strip spring may have a longitudinal axis extending substantially aligned with a branch side sidewall of the inclined trunk. The cargo management system may further include a receiver outboard of the first intersection. That receiver may receive and hold a first end of the first spring guide/strip spring.

The panel may further include two opposed latch pins and a latch actuator that may be manipulated to displace the opposed latch pins between a stowed position, allowing the panel to be displaced between operating positions, and a deployed position. The cargo management system may further include a plurality of latch pin supports to support the opposed latch pins when the opposed latch pins are deployed and the panel is in one of the plurality of operating positions.

The cargo management system may further include a first trim panel, a second trim panel and a floor storage compartment. A first guide track of the opposed guide tracks may be provided in the first trim panel. A second guide track of the two opposed guide tracks may be provided in the second trim panel. The second guide track may be a mirror image of the first guide track. The panel may extend between the first trim panel and the second trim panel and overlie the floor storage compartment.

The plurality of operating positions may include a first position wherein the opposed pivot pins are held in the first branch and the opposed latch pins are received and held in a first set of latch pin supports carried on the first trim panel and the second trim panel. The plurality of operating positions may also include a second position wherein the opposed pivot pins are held in the second branch and the opposed latch pins are received and held in a second set of latch pin supports carried on the first trim panel and the second trim panel. Still further, the plurality of operating positions may further include a third position wherein the opposed pivot pins are held in the third branch and the opposed latch pins are received and held in a third set of latch pin supports carried on the first trim panel and the second trim panel.

Still further, the first branch may be parallel to the second branch and the third branch. The first branch may also be below the second branch and the third branch may be provided above the second branch. Still further, the inclined trunk may be inclined toward the plurality of branches from the first end of the inclined trunk toward the second end of the inclined trunk.

In the following description, there are shown and described several preferred embodiments of the cargo management system. As it should be realized, the cargo management system is capable of other, different embodiments and its several details are capable of modification in various, obvious aspects all without departing from the cargo management system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo management system and together with the description serve to explain certain principles thereof.

FIGS. 1A-1D are a series of views illustrating the panel of the cargo management system in three different operating positions.

More particularly, FIG. 1A is a detailed view of the cargo management system illustrating the panel in a first operating position wherein the panel functions as a cargo floor of the cargo area of the motor vehicle.

FIG. 1C is a perspective view of the cargo management system illustrating the panel in a second operating position wherein the panel functions as a shelf that divides the cargo area into an upper section and a lower section.

FIG. 1D is a perspective view of the cargo management system illustrating the panel in a third operating position wherein the panel functions as a cargo cover overlying and concealing from view items held in the cargo area including the floor storage compartment.

FIG. 2A is a detailed elevational view of the first guide track of the guideway provided in the first trim panel of the cargo management system.

FIG. 2B is an elevational view of the second guide track of the guideway provided in the second trim panel of the cargo management system.

FIG. 3 is a detailed perspective view of the first spring guide provided at the first intersection where the first branch joins the inclined trunk of the second guide track.

Figure 4A:
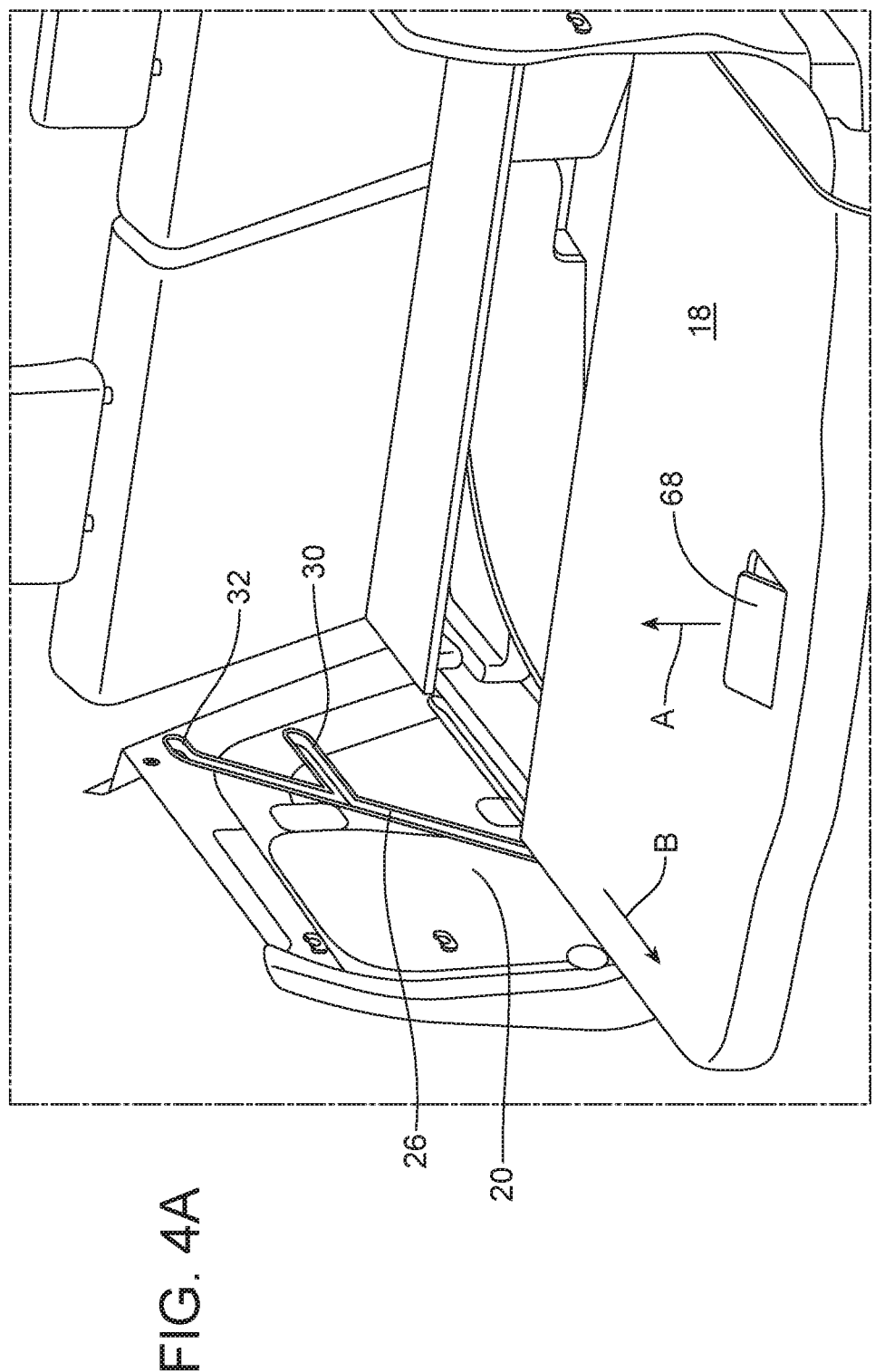
FIGS. 4A-4F are a series of views illustrating displacement of the panel between the first operating position, the second operating position and the third operating position.

More specifically, FIG. 4A is a perspective view illustrating how the panel is initially displaced from the first operating position (shown in FIG. 1A) toward the second and third operating positions (shown respectively in FIGS. 1C and 1D).

Figure 4B:
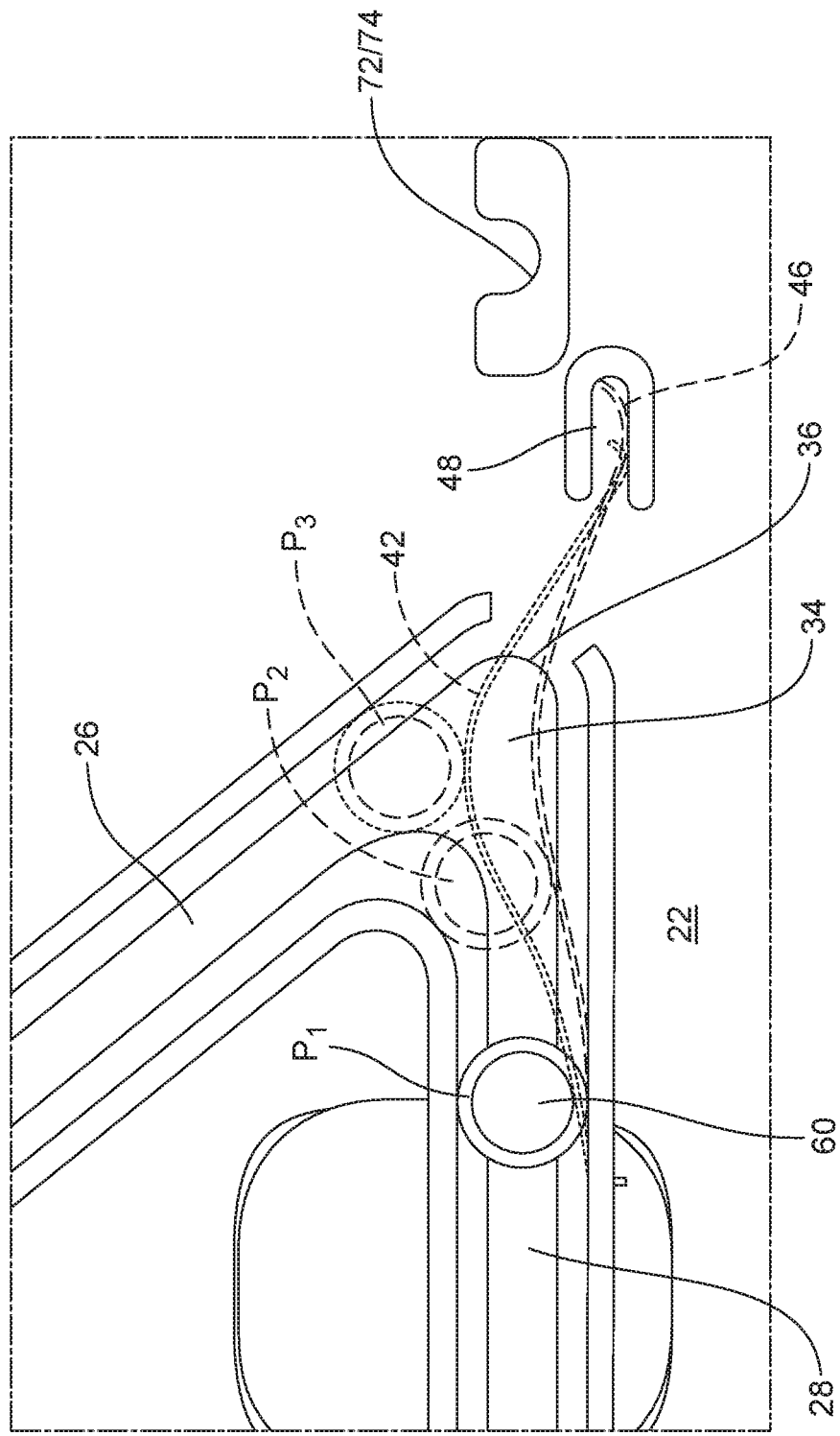

FIG. 4B is a detailed elevational view illustrating the path of travel of the pivot pin at one corner of the panel along the first branch and through the first intersection into the inclined trunk of the second guide track as the panel is displaced from the first operating position toward the second operating position.

Figure 4C:
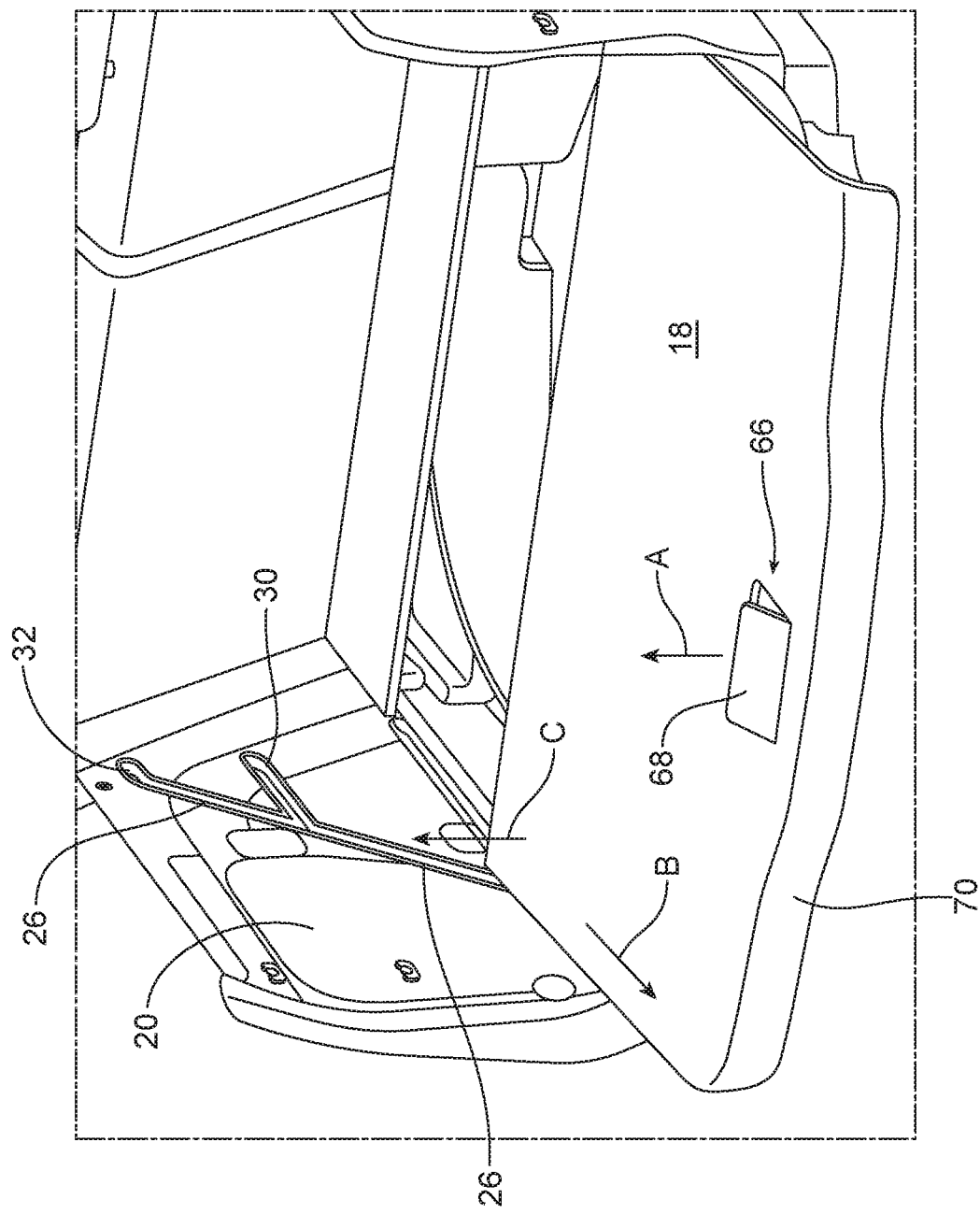

FIG. 4C is a perspective view illustrating how the panel is further displaced along the inclined trunk toward the second and third operating positions.

Figure 4D:
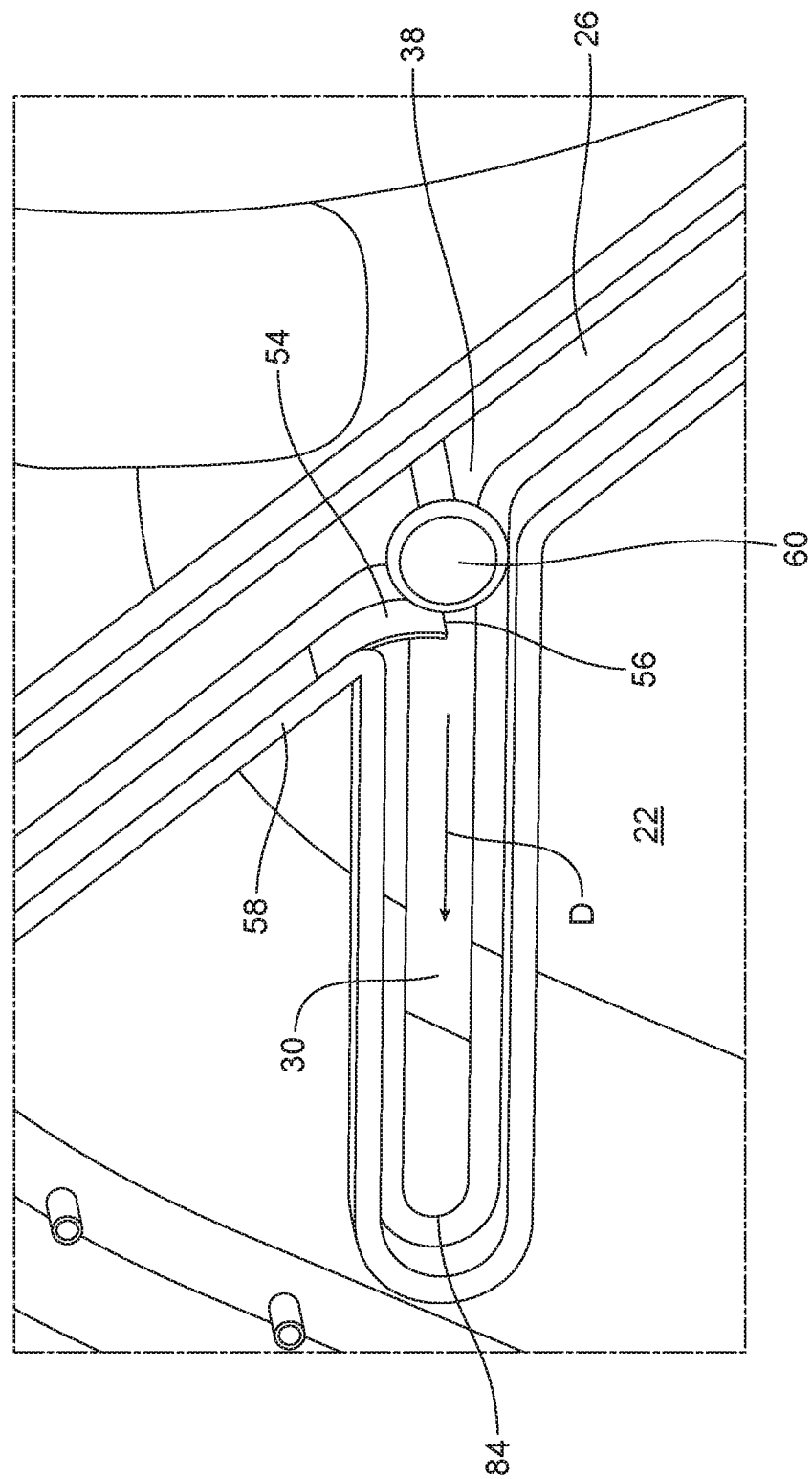

FIG. 4D is a detailed perspective view illustrating engagement of the pivot pin at one corner of the panel with the second spring guide at the second intersection where the second branch joins the inclined trunk.

Figure 4E:
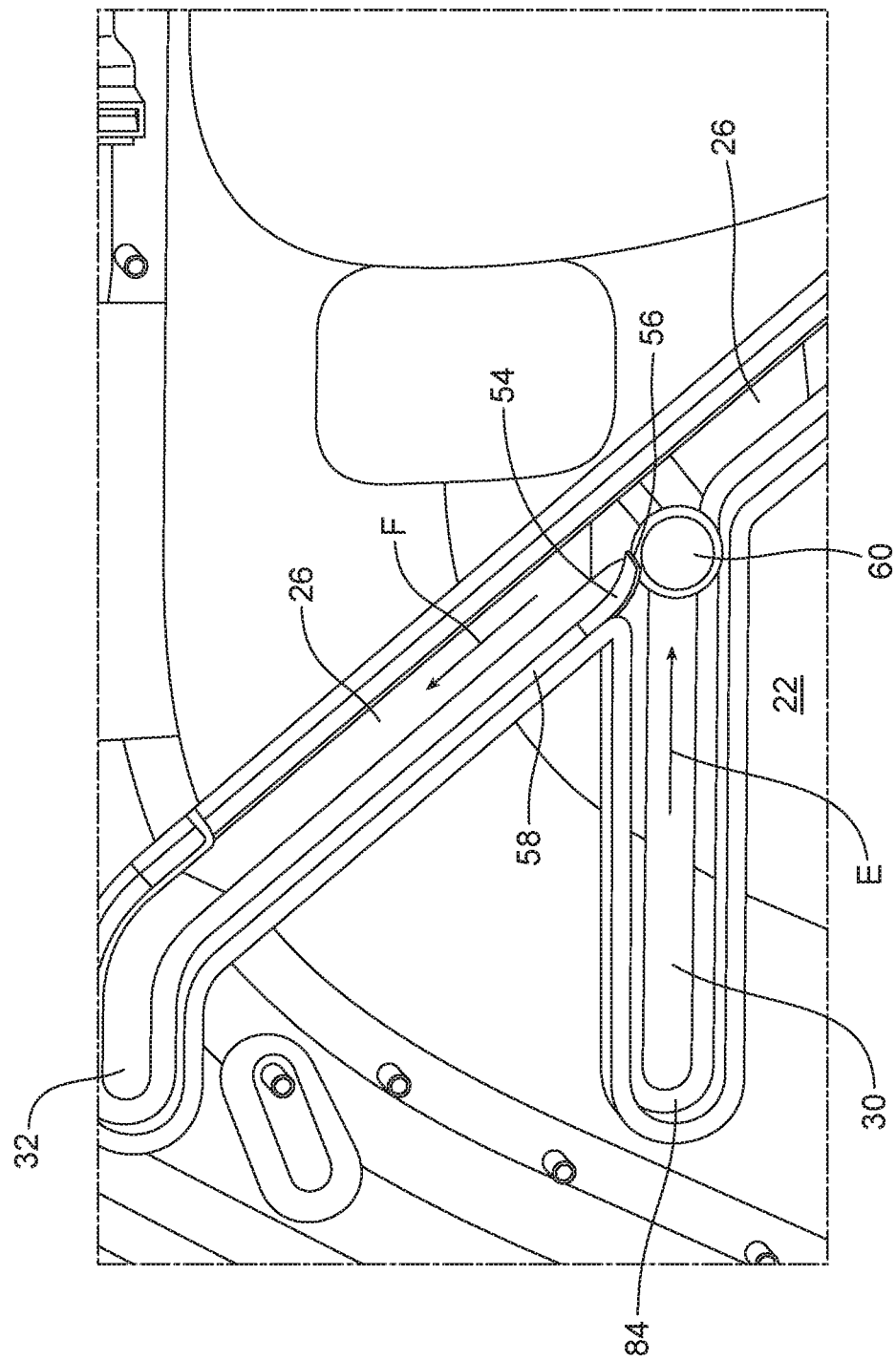

FIG. 4E is a view similar to FIG. 4D but illustrating movement of the pivot pin past the second spring guide into the second branch of the second guide track as the panel is displaced into the second operating position illustrated in FIG. 1C.

Figure 4F:
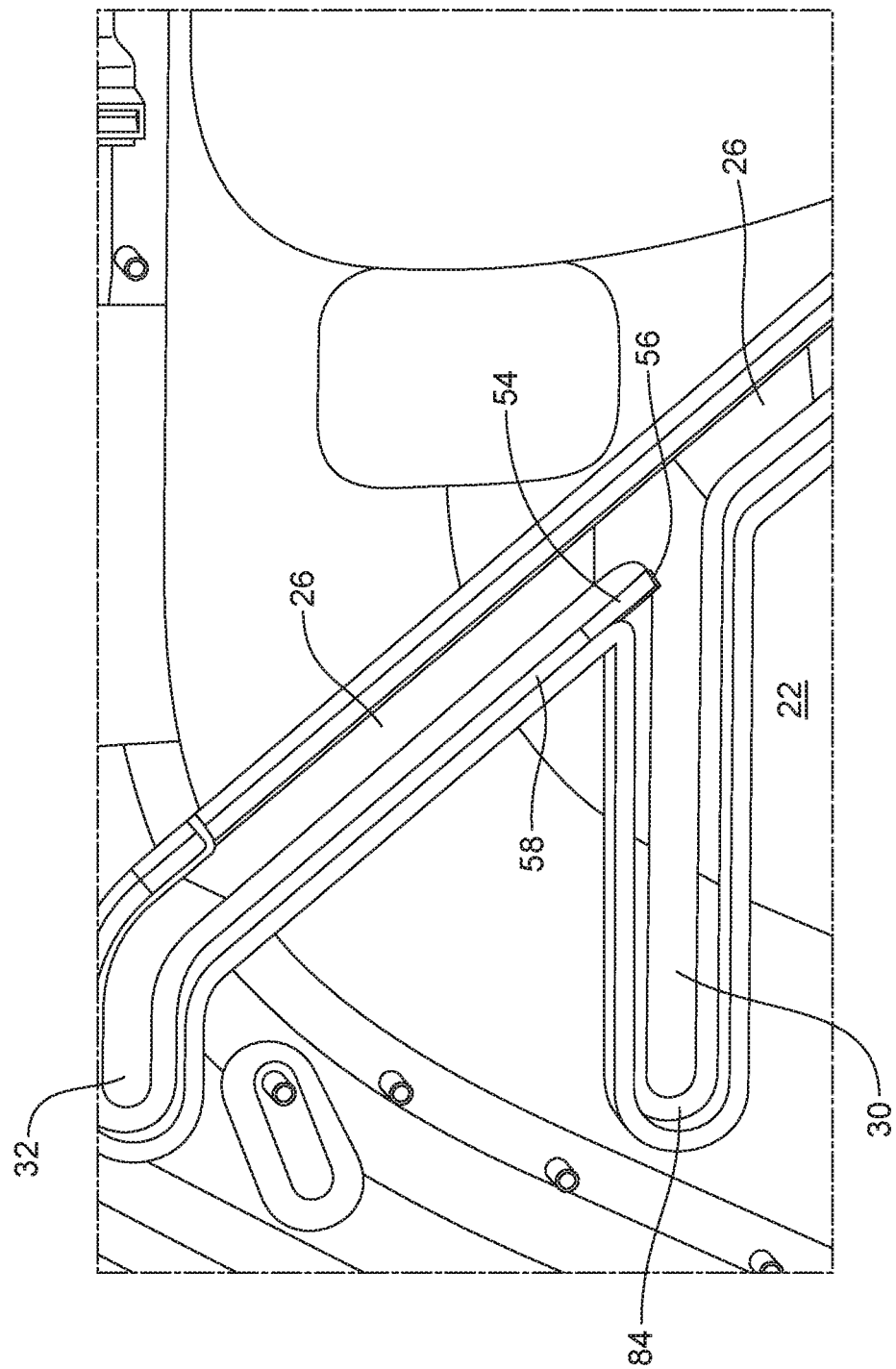

FIG. 4F is a view similar to FIGS. 4D and 4E but illustrating movement of the pivot pin past the second spring guide along the inclined trunk toward the third operating position illustrated in FIG. 1D.

Figure 5:
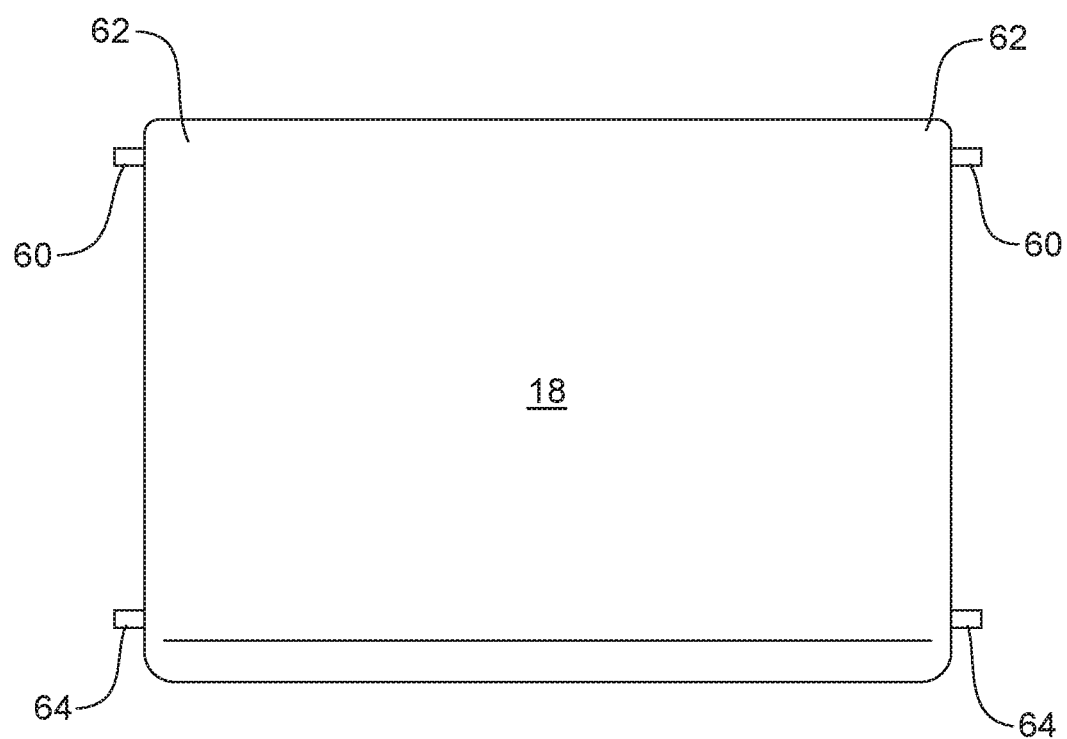

FIG. 5 is a bottom plan view illustrating the displaceable panel.

FIG. 6A is a detailed perspective view of one of the latch pins on the panel illustrating the latch pin in the retracted position.

FIG. 6B is a detailed perspective view illustrating one of the latch pins in a retracted position and aligned with a latch pin support provided on the first trim panel.

FIG. 6C is a view similar to FIG. 5B but illustrating the latch pin in a deployed position engaged in the cooperating latch support.

Reference will now be made in detail to the present preferred embodiments of the cargo management system, examples of which are illustrated in the accompanying drawing figures.

DETAILED DESCRIPTION

Reference is now made to the drawing Figures which illustrate the new and improved cargo management system 10. That cargo management system 10 includes a guideway 12 including opposed guide tracks 14, 16, and a panel 18 displaceable between a plurality of operating positions along the guideway.

As best illustrated in FIGS. 1A, 1C and 1D, the cargo management system 10 may include a first trim panel 20, a second trim panel 22 and a floor storage compartment 24. The first guide track 14 is provided in the first trim panel 20. The second guide track 16 is provided in the second trim panel 22.

As best illustrated in FIG. 2A, the first guide track 14 includes an inclined trunk 26 and a plurality of branches 28, 30, 32 extending from the inclined trunk.

As illustrated, the first branch 28 has a first length $L_1$, the second branch 30 has a second length $L_2$ and the third branch 32 has a third length $L_3$ where $L_1 > L_2 > L_3$.

The first branch 28 joins the inclined trunk 26 at a first intersection 34 at a lower or first end 36 of the inclined trunk. The second branch 30 joins the inclined trunk 26 at a second intersection 38 at an intermediate point of the inclined trunk. The third branch 32 joins the inclined trunk 26 at an upper or second end 40 of the inclined trunk.

As should be further appreciated, the first branch 28, second branch 30 and third branch 32 are all parallel. Further, in the illustrated embodiment, the first branch 28 is below the second branch 30 and the third branch 32 is above the second branch. Further, the inclined trunk 26 is inclined toward the plurality of branches 28, 30, 32 from the first end 36 of the inclined trunk toward the second end 40 of the inclined trunk.

As illustrated in FIG. 2B, the second guide track 16 is a mirror image of the first guide track 14. Reference numbers 26, 28, 30, 32, 34, 36, 38 and 40 used to identify the structural features of the first guide track 14 are also used to identify the corresponding structural features of the second guide track 16.

In the illustrated embodiment in FIGS. 2A and 2B, a first spring guide 42 is provided at the first intersection 34 of each of the first and second guide tracks 14, 16. That first spring guide 42 may comprise a strip spring having an intermediate section 44 extending at least partially across the inclined trunk 26 and the first branch 28. A first end or terminus 46 of the strip spring/first spring guide 42 is received and held in a receiver 48 outboard of the first intersection 34 while a second end or terminus 50 is secured in a wall 52 of the first branch 28 (see FIG. 3 for details).

A second spring guide 54 is provided at the second intersection 38. See FIGS. 4D-4F. That second spring guide 54 may comprise a cantilevered strip spring having a free end 56 extending partially across the second branch 30 at the second intersection 38. As best shown in detail in FIG. 4F, the cantilevered strip spring/second spring guide 54 has a longitudinal axis extending substantially aligned with the branch side sidewall 58 of the inclined trunk 26.

The panel 18 may be made from plastic, fiberglass, man-made composites or other appropriate material. As best illustrated in FIG. 5, the panel 18 includes opposed pivot pins 60 projecting outward laterally from the forward corners 62 of the panel. One pivot pin 60 is received in and slides along each of the guide tracks 14, 16 of the guideway 12.

The panel 18 further includes two opposed latch pins 64 and a latch actuator 66 for displacing the opposed latch pins between a retracted or stowed position as illustrated in FIG. 6B and an extended or deployed position as illustrated in FIG. 6C. In the illustrated embodiment, the actuator 66 comprises a handle 68 pivotally mounted to the body 70 of the panel 18. Spring loaded, opposed latch pins 64 controlled by means of a pivoting actuator 66 of the type described are known in the art.

Figure 1B:
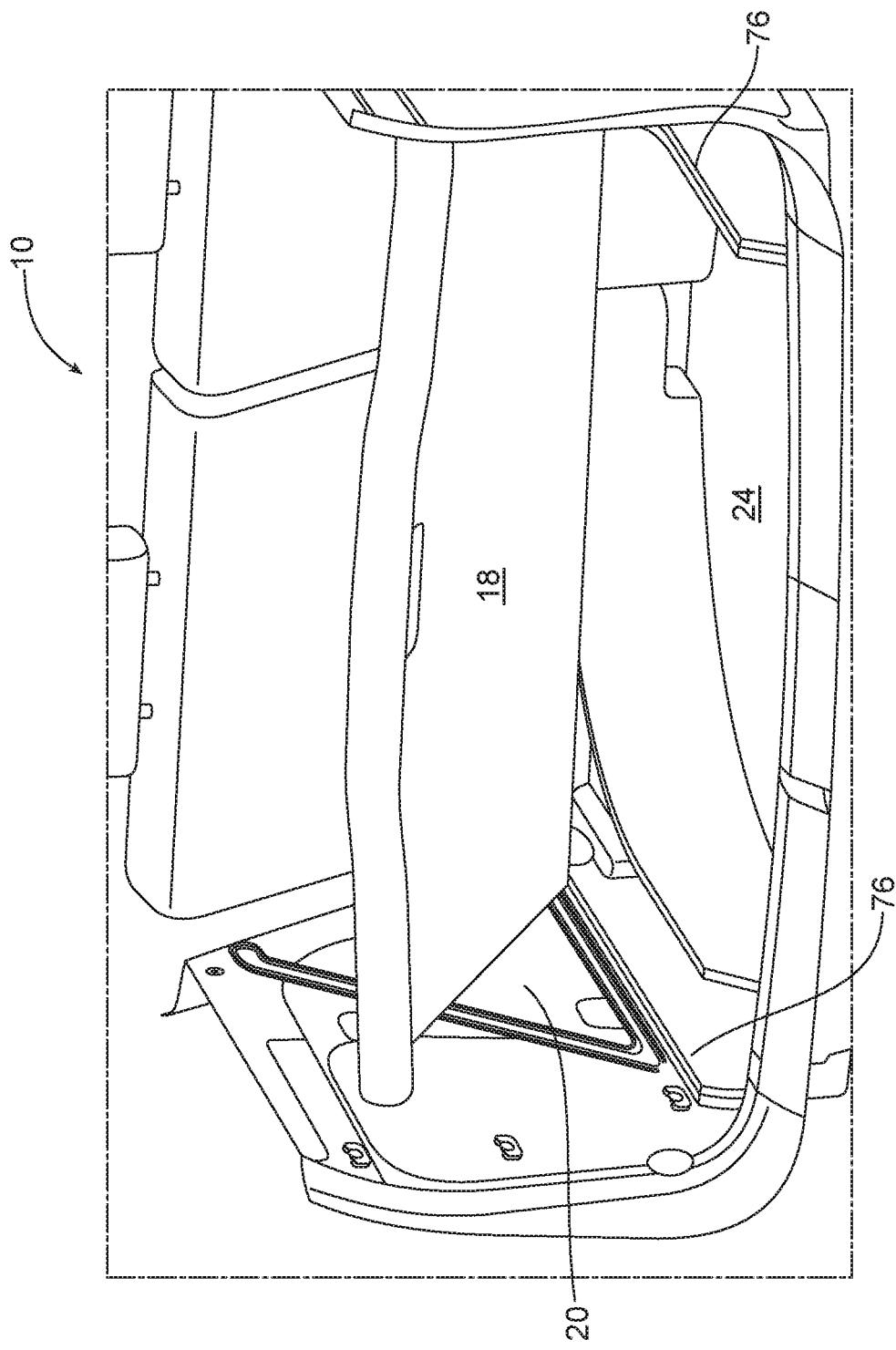
FIG. 1B is a perspective view of the cargo management system illustrating the rear end of the panel tilted upward to allow access to the underlying floor storage compartment when the panel is in the first position.

A plurality of latch pin supports 72 are provided to engage, receive and support the opposed latch pins 64 when the opposed latch pins are deployed and the panel 18 is in one of the plurality of operating positions. More particularly, a first set of opposed latch pin supports 74 are provided on the first trim panel 20 and second trim panel 22 and adapted to support the panel 18 in a lowermost or first position illustrated in FIG. 1A when the opposed latch pins 64 are extended. In this position, the panel 18 fits flush against the base 76 of the cargo well or floor storage compartment 24 completely concealing that compartment from view. As illustrated in FIG. 1B, one may raise the handle 68 to retract the latch pins 64 from the opposed latch pin supports 74 and pivot the panel 18 as illustrated to access the underlying floor storage compartment 24 if desired.

When the panel 18 is in the first position illustrated in FIG. 1A, the opposed pivot pins 60 are held in the first branch 28 and the opposed latch pins 64 are extended and received and held in the first set of latch pin supports 74 carried on the first trim panel 20 and second trim panel 22.

As illustrated in FIG. 1C, the cargo management system 10 includes a second operating position wherein the opposed pivot pins 60 are held in the second branch 30 and the opposed latch pins 64 are received and held in a second set of latch pin supports 80 carried on the first trim panel 20 and the second trim panel 22. Further, as illustrated in FIG. 1D, the panel 18 may be secured in a third position wherein the opposed pivot pins 60 are held in the third branch 32 of the first and second guide tracks 14, 16 and the opposed latch pins 64 are received and held in a third set of latch pin supports 82 carried on the first trim panel 20 and the second trim panel 22.

Reference is now made to FIGS. 4A-4F illustrating how the panel 18 is displaced between the first operating position illustrated in FIG. 1A, the second operating position illustrated in FIG. 1C, and the third operating position illustrated in FIG. 1D.

In order to displace the panel 18 from the first operating position illustrated in FIG. 1A to the second operating position illustrated in FIG. 1C, one raises the handle 68 in order to release the latch pins 64 from the opposed first set of latch pin supports 74. (Note action arrow A.) One then slides the panel 18 rearward in the direction of action arrow B until the opposed pivot pins 60 pass the first spring guides 42 and enter the inclined trunks 26. Note FIG. 4B illustrating the passage of one pivot pin 60 from the first branch 28 to the inclined trunk 26. Note particularly how the first spring guide 42 bends as the pivot pin is moved through the intersection between the first branch 28 and the inclined trunk 26 from position $P_1$ to position $P_2$ and then to position $P_3$.

Once the pivot pins 60 are positioned in the opposed inclined trunks 26, the panel 18 is raised (note action arrow C in FIG. 4C) so that the pivot pins slide along the inclined trunks 26 toward the second spring guide 54 (see FIG. 4D). At this point, one may position the panel 18 in the second position by pressing the pivot pins 60 (note action arrow D in FIG. 4D) past the second spring guides 54 toward the terminal end 84 of the second branches 30 and then locking the latch pins 64 in the second latch pin supports 80 in order to secure the panel 18 in the second position illustrated in FIG. 1C.

When desired one may displace the panel 18 from the second operating position to the uppermost or third position by then displacing the pivot pins 60 in the direction of action arrow E, past the second spring guide 54 into the inclined trunk 26 (see FIG. 4E) and then upwardly, in the direction of action arrow F, along the inclined trunk 26 past the second spring guides 54 to the third branches 32 until the panel 18 is in the third or uppermost position illustrated in FIG. 1D. The latch pins 64 are then aligned with the third set of latch pin supports 82 to latch the panel 18 in this third or uppermost position. As should be apparent from this description, it is also possible to displace the panel 18 directly between the first and third operating positions if desired. The second spring guide 54 helps to accommodate such a movement.

One may displace the panel 18 between any of the various positions illustrated in FIGS. 1A-1D as desired by manipulating the actuator 66/handle 68 and sliding the pivot pins 60 along the inclined trunks 26 of the first and second guide tracks 14, 16 between the first branches 28, the second branches 30 and the third branches 32 as illustrated and described. The first spring guides 42 and the second spring guides 54 function to help direct the pivot pins 60 through the first and second guide tracks 14, 16 in a precise and straightforward manner between the various operating positions.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cargo management system, comprising:
a guideway including opposed guide tracks, each of said opposed guide tracks including an inclined trunk and a plurality of branches extending from said inclined trunk; and
a panel displaceable between a plurality of operating positions, said panel including opposed pivot pins received in said opposed guide tracks wherein said plurality of branches includes a first branch, a second branch and a third branch wherein said first branch has a first length $L_1$, said second branch has a second length $L_2$ and said third branch has a third length $L_3$ wherein $L_1 > L_2 > L_3$.

2. The cargo management system of claim 1, wherein said first branch joins said inclined trunk at a first intersection at a first end of said inclined trunk.

3. The cargo management system of claim 2, wherein said second branch joins said inclined trunk at a second intersection at an intermediate point of said inclined trunk.

4. The cargo management system of claim 3, wherein said third branch joins said inclined trunk at a second end of said inclined trunk.

5. The cargo management system of claim 4, further including a first spring guide at said first intersection.

6. The cargo management system of claim 5, further including a second spring guide at said second intersection.

7. The cargo management system of claim 6, wherein said first spring guide is a strip spring having an intermediate section extending at least partially across said inclined trunk and said first branch.

8. The cargo management system of claim 7, further including a receiver outboard of said first intersection receiving and holding an end of said strip spring.

9. The cargo management system of claim 8, wherein said second spring guide is a cantilevered strip spring having a free end extending at least partially across said second branch at said second intersection.

10. The cargo management system of claim 9, wherein said cantilevered strip spring has a longitudinal axis extending substantially aligned with a branch side sidewall of said inclined trunk.

11. The cargo management system of claim 1, wherein said panel further includes two opposed latch pins and a latch actuator displacing said opposed latch pins between a stowed position and a deployed position.

12. The cargo management system of claim 11, wherein said cargo management system includes a plurality of latch pin supports to support said opposed latch pins when said opposed latch pins are deployed and said panel is in one of said plurality of operating positions.

13. The cargo management system of claim 12, further including a first trim panel, a second trim panel and a floor storage compartment, a first guide track of said opposed guide tracks being provided in said first trim panel, a second guide track of said opposed guide tracks being provided in said second trim panel wherein said second guide track is a mirror image of said first guide track and said panel extending between said first trim panel and said second trim panel and overlying said floor storage compartment.

14. The cargo management system of claim 13, wherein said plurality of operating positions includes a first position wherein said opposed pivot pins are held in said first branch and said opposed latch pins are received and held in a first set of said latch pin supports carried on said first trim panel and said second trim panel.

15. The cargo management system of claim 14, wherein said plurality of operating positions includes a second position wherein said opposed pivot pins are held in said second branch and said opposed latch pins are received and held in a second set of said latch pin supports carried on said first trim panel and said second trim panel.

16. The cargo management system of claim 15, wherein said plurality of operating positions includes a third position wherein said opposed pivot pins are held in said third branch and said opposed latch pins are received and held in a third set of said latch pin supports carried on said first trim panel and said second trim panel.

17. The cargo management system of claim 16, wherein said first branch is parallel to said second branch and said third branch.

18. The cargo management system of claim 17, wherein said first branch is below said second branch and said third branch is above said second branch.

19. The cargo management system of claim 18, wherein said inclined trunk is inclined toward said plurality of branches from a first end of said inclined trunk toward a second end of said inclined trunk.

20. A cargo management system, comprising:
a guideway including opposed guide tracks, each of said opposed guide tracks including an inclined trunk and a plurality of branches extending from intersections with said inclined trunk;
a panel displaceable between a plurality of operating positions, said panel including opposed pivot pins received in said opposed guide tracks; and
a spring guide provided at at least one of said intersections.

* * * * *